N. R. STILES.
SHOCK ABSORBER FOR TYPE WRITERS.
APPLICATION FILED JUNE 27, 1912.

1,072,526.

Patented Sept. 9, 1913.

3 SHEETS—SHEET 1.

WITNESSES:
John C. Sanders
Albert F. Heuman

INVENTOR
Noel Ray Stiles
BY Wm. Wallace White
ATTY.

N. R. STILES.
SHOCK ABSORBER FOR TYPE WRITERS.
APPLICATION FILED JUNE 27, 1912.
1,072,526.
Patented Sept. 9, 1913.
3 SHEETS—SHEET 2.
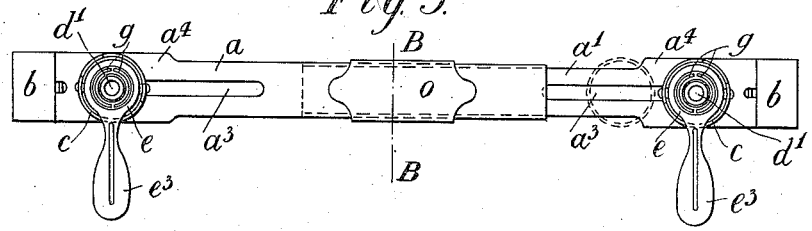
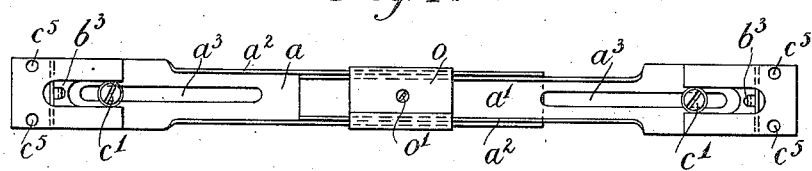
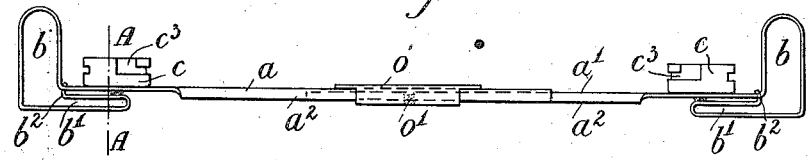
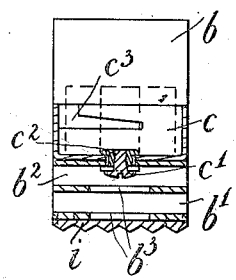 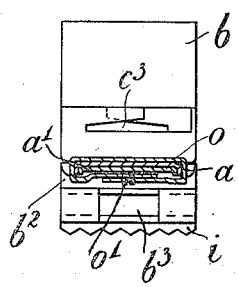

N. R. STILES.
SHOCK ABSORBER FOR TYPE WRITERS.
APPLICATION FILED JUNE 27, 1912.

1,072,526.

Patented Sept. 9, 1913.

3 SHEETS—SHEET 3.

WITNESSES:
John C. Sanders
Albert F. Heuman

INVENTOR
Noel Ray Stiles
BY Wm Wallace White
ATT'Y

UNITED STATES PATENT OFFICE.

NOEL RAY STILES, OF LONDON, ENGLAND.

SHOCK-ABSORBER FOR TYPE-WRITERS.

1,072,526.  Specification of Letters Patent.  Patented Sept. 9, 1913.

Application filed June 27, 1912. Serial No. 706,139.

*To all whom it may concern:*

Be it known that I, NOEL RAY STILES, a citizen of the United States of America, residing at 8 Newgate street, London, E. C., England, have invented new and useful Improvements in Shock-Absorbers for Type-Writers, of which the following is a specification.

This invention relates to an improved construction of shock absorber for typewriters and it refers to devices of the kind in which a resilient support is interposed between the said typewriter and the surface or body upon which it is supported comprising a member upon which the machine rests having vertical arched portions at each end.

The present invention has for its object various improvements in supports of this character adapted to increase the resiliency of the support and to provide for the ready application of such support to machines of different makes and widths of frame.

The invention further provides for the ready attachment and removal of the machine in cases where the support is required to be fixed to the supporting surface or body, the method of attachment being such that there is no metal to metal contact and further that the loci of the points of attachment coincide with that of the supporting legs or columns of the machine.

These and other objects of this invention are hereafter fully described and pointed out in the claims.

In order that the invention may be the better understood, drawings are appended in which:—

Figure 1:
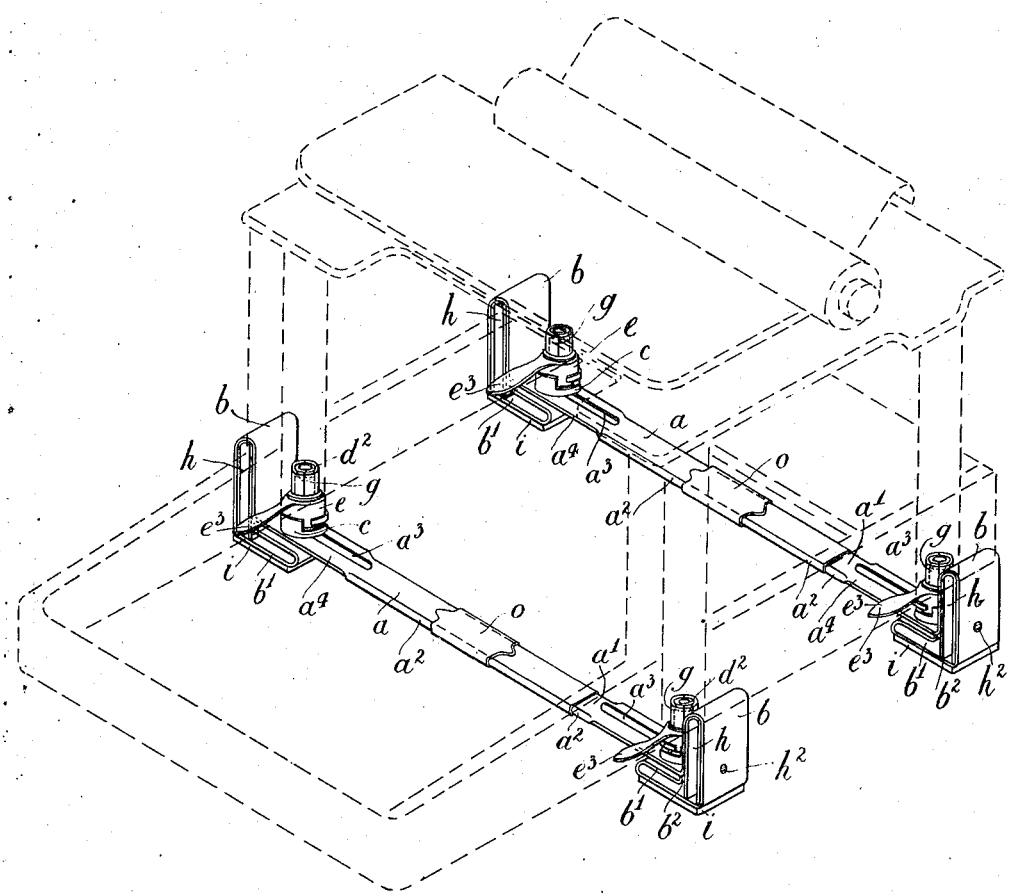
Figure 2:
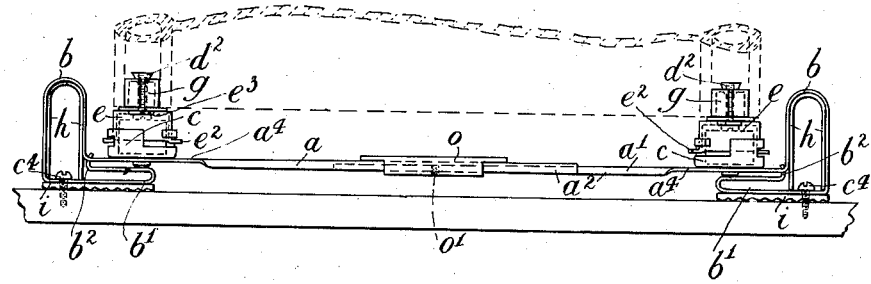
Figure 8:
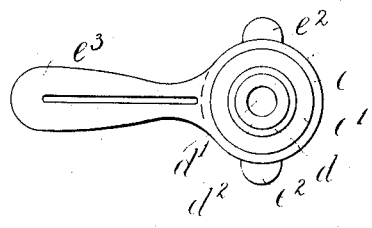
Figure 9:
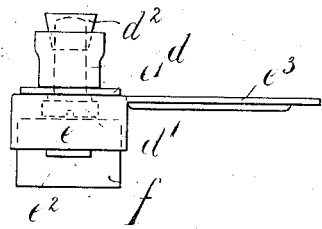
Figure 10:
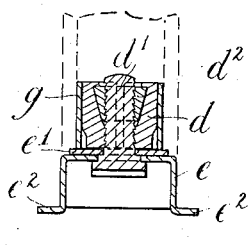
Figure 11:
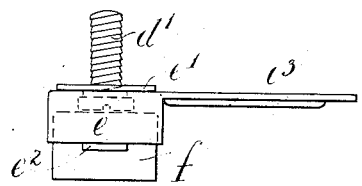
Figure 12:

Figure 1 is a perspective view showing the device applied to a typewriter. Fig. 2 is a front elevation of said device. Fig. 3 is a top plan. Fig. 4 is a plan of the underside. Fig. 5 is a front elevation of the device detached from the machine. Fig. 6 is a section on line A A Fig. 5. Fig. 7 is a section on line B B Fig. 5. Fig. 8 is a plan of the means of attachment for the machine to the shock absorber. Fig. 9 is a side view. Fig. 10 is a vertical section. Fig. 11 is a side view with the expansible member omitted. Fig 12 is a front view of a means for strengthening the arched end members of the support when the device is applied to a machine of more than ordinary weight.

Referring to the appended drawings, $a$ $a^1$ indicate two plates or strips of metal each having a portion of the side edge at $a^2$ turned down for the purpose of adding to the strength and rigidity of the said plates. Each plate at $a^3$ is slotted for a portion of its length such slot extending from the flattened end portion $a^4$ formed at the outer end of each strip to a convenient point of the length of said strip. The flattened end just referred to is turned or bent as shown to produce an arched shaped bend $b$, the plane of which is at a right angle to the line of the body of the said strip and the flattened end is further bent to form a second similar arch shaped bend $b^1$ which bend is disposed in a plane at a right angle to the first bend and is disposed beneath the body of the strip. As it is by means of these bends that the vertical and longitudinal resiliency of the absorber is obtained, they may for the purpose of distinction be referred to as "spring bends". The second bend $b^1$ has upon its upper limb a third bend $b^2$ formed simply by bending or turning the end of the upper limb of $b^1$ upward at a right angle to the said bend $b^1$. The bodies of the members $a$ $a^1$ have each of them a bearing upon the bends $b^1$. The plates $a$ $a^1$ are placed one upon the other, the turned over side edges $a^2$ of one plate lying inside the side edges of the other as shown in Fig. 7. Encircling the two plates $a$ $a^1$ is a band like body $o$, the ends of which overlap and have passing through them a screw $o^1$ whereby the said plates $a$ $a^1$ may be clamped together to secure them after their adjustment to suit the width of the frame of the machine. By means of this arrangement as will be evident, one absorber is capable of application to a number of machines and the necessity of providing a number of absorbers of different lengths to meet the requirements of the various makes of typewriters is avoided and the one type of absorber is capable of universal application.

$c$ indicate metal or other cups which are adjustably secured to the plates $a$ $a^1$ by means of screws $c^1$ passing through the aforesaid slots $a^3$ and into the nuts $c^2$ upon the cups. The cups are provided in their vertical walls with slots $c^3$ after the manner of the slots in the well known bayonet joint connection and by means of these cups and slots as will be presently described, it is possible to readily apply and remove the machine from the absorber without the necessity of removing the said absorber from the surface to which it is attached and which attachment is effected when desired by means of screws $c^4$ passing through holes $c^5$ formed in the lower horizontal member of the spring bend $b^1$. To permit of ready access to the screw upon the cup $c$, I slot the members of the bend $b^1$ at $b^3$ as shown in Fig. 4, 6 and 7, or same may be pierced.

In the majority of typewriters as at present constructed, the underframe is provided with four tubular legs or supports to which are applied rubber plugs. The cups before referred to are provided for the purpose of engaging the aforesaid legs and in order that the desired attachment of the machine to the absorber may be effected, I provide the arrangement shown in detail in Figs. 8 to 11. The device referred to comprises a rubber body $d$ designed to enter the aforesaid tubular leg and from which leg the aforesaid original plug is first removed. The body $d$ has passing through it a screw $d^1$ the upper end of which engages a screw formed in a conical nut $d^2$ and which nut as will be readily understood, when it is drawn down will cause the body $d$ to expand until it fills the aforesaid hollow leg of the machine. The screw $d$ passes through the top of a cap $e$ and between the top of the cap $e$ and the lower end of the body $d$ I prefer to interpose a washer $e^1$. The cap $e$ is provided with peripheral projections or ears $e^2$ designed to engage the aforesaid slots in the walls of cups $c$ whereby the attachment of the caps $e$ to the members $a$ $a^1$ may be effected. In order to conveniently effect the rotation of the caps $e$, I prefer to provide the said caps with a handle or projection $e^3$ see Figs. 1, 3, 8, 9 and 11.

$f$ indicates a rubber or other plug placed in the underside of the cap $e$ and which plug is compressed when the cap $e$ is rotated to effect the attachment of the said cap to the plates $a$ $a^1$. Where the space to be filled is beyond the limits of expansion of the body $d$, I may provide a split liner or a line $g$ formed in two parts which is applied to the exterior of the body $e$ as shown in Figs. 1, 2, 3 and 10.

Where the absorber is applied to machines of more than ordinary weight, I provide a supplementary body such as $h$ Figs. 1, 2 and 12 which is of a corresponding outline to the bend $b$ and which is adapted to be compressed and sprung into the said bend as shown in the figures just referred to. In order to prevent the accidental displacement of the body $h$ I provide a projection such as $h^1$ formed by pressing or indenting the metal and which projection enters a perforation $h^2$ Fig. 1, formed in the outer limb of the bend $b$. In order to prevent damage to the surface to which the absorber is secured, I may provide the portion in contact with the said surface with a rubber or other coating indicated by $i$ Figs. 2, 6 and 7.

By means of an absorber constructed in the manner just described, I am enabled to secure in addition to the increased resiliency the advantage that the one device is capable of universal application.

Claims—

1. In a shock absorber for typewriters, in combination, a longitudinally extensible member, a vertical spring bend at each end of said member, a second spring bend at a right angle to the first and disposed beneath the body of the extensible member, and having a bearing surface adapted to rest upon the table or surface which supports the device, a bearing for said extensible member on the second spring bend and means upon said member for the attachment of the typewriter.

2. In a shock absorber for typewriters, in combination, an extensible member formed in two parts, a clamp adjustably connecting the two parts, a vertical spring bend at the outer end of each part, a second spring bend at a right angle to the first and disposed beneath the outer ends of the parts, a bearing for said extensible member upon the second spring bend, slots at each end of the member, screws passing through said slots and cups attached to said screws and bodies removably attached to said cups and engaging the hollow legs of the typewriter.

3. In a shock absorber for typewriters, in combination, an extensible member formed in two parts, a clamp adjustably connecting the two parts, a vertical spring bend at the outer end of each part, a second spring bend at a right angle to the first and disposed beneath the outer ends of the parts, a bearing for said extensible member upon the second spring bend, slots at each end of the member, screws passing through said slots and cups attached to said screws, inclined slots in said cups, a body engaging the legs of the typewriter, projections on said body engaging said slots, and means for rotating said body.

4. In a shock absorber for typewriters, in combination, an extensible member formed in two parts, a clamp adjustably connecting the two parts, a vertical spring bend at the outer end of each part, a second spring bend at a right angle to the first and disposed beneath the outer ends of the parts, a bearing for said extensible member upon the second spring bend, slots at each end of the member, screws passing through said slots and cups attached to said screws, inclined slots in said cups, a second cup, projections on said cups, a rubber plug on said cup, means for rotating said cups, a screw passing through the top of said cups, a rubber body upon said screw and a conical nut engaging said screw in said rubber body.

5. In a shock absorber for typewriters, in combination, an extensible member formed in two parts, a clamp adjustably connecting the two parts, a vertical spring bend at the outer end of each part, a second spring bend at a right angle to the first and disposed beneath the outer ends of the parts, a bearing for said extensible member upon the second spring bend, slots at each end of the member, screws passing through said slots and cups attached to said screws, inclined slots in said cups, a second cup, projections on said cups, a rubber plug on said cup, means for rotating said cups, a screw passing through the top of said cups, a rubber body upon said screw and a conical nut engaging said screw in said rubber body, means for reinforcing the vertical spring bends.

6. In a shock absorber for typewriters, in combination, an extensible member formed in two parts, a clamp adjustably connecting the two parts, a vertical spring bend at the outer end of each part, a second spring bend at a right angle to the first and disposed beneath the outer ends of the parts, a bearing for said extensible member upon the second spring bend, slots at each end of the member, screws passing through said slots and cups attached to said screws, inclined slots in said cups, a second cup, projections on said cups, a rubber plug on said cup, means for rotating said cups, a screw passing through the top of said cups, a rubber body upon said screw and a conical nut engaging said screw in said rubber body, means for reinforcing the vertical spring bends, comprising U shaped bodies adapted to be sprung into the said vertical spring bends.

7. In a shock absorber for typewriters, in combination, an extensible member formed in two parts, a clamp adjustably connecting the two parts, a vertical spring bend at the outer end of each part, a second spring bend at a right angle to the first and disposed beneath the outer ends of the parts, a bearing for said extensible member upon the second spring bend, slots at each end of the member, screws passing through said slots and cups attached to said screws, inclined slots in said cups, a second cup, projections on said cups, a rubber plug on said cup, means for rotating said cups, a screw passing through the top of said cups, a rubber body upon said screw and a conical nut engaging said screw in said rubber body, means for reinforcing the vertical spring bends, comprising U shaped bodies adapted to be sprung into the said vertical spring bends, perforations in the outer walls of said spring bends, and projections upon the outer walls of said reinforcing bodies, said projections entering said holes in said spring bends.

In testimony whereof I have signed my name to this specification in the presence of two subscribing witnesses.

NOEL RAY STILES.

Witnesses:
  Wm. P. Jones,
  John C. Sanders.